US007462821B2

(12) United States Patent
Barket, Jr. et al.

(10) Patent No.: US 7,462,821 B2
(45) Date of Patent: Dec. 9, 2008

(54) INSTRUMENTATION, ARTICLES OF MANUFACTURE, AND ANALYSIS METHODS

(75) Inventors: Dennis Barket, Jr., Lafayette, IN (US); J. Mitchell Wells, Lafayette, IN (US)

(73) Assignee: Griffin Analytical Technologies, L.L.C., West Lafayette, IN (US)

( * ) Notice: Subject to any disclaimer, the term of this patent is extended or adjusted under 35 U.S.C. 154(b) by 446 days.

(21) Appl. No.: 10/554,039

(22) PCT Filed: Apr. 26, 2004

(86) PCT No.: PCT/US2004/012849

§ 371 (c)(1), (2), (4) Date: Oct. 20, 2005

(87) PCT Pub. No.: WO2004/097352

PCT Pub. Date: Nov. 11, 2004

(65) Prior Publication Data

US 2006/0243901 A1 Nov. 2, 2006

Related U.S. Application Data

(60) Provisional application No. 60/465,367, filed on Apr. 25, 2003.

(51) Int. Cl.
*B01D 59/44* (2006.01)

(52) U.S. Cl. ........................ 250/288; 250/282; 250/281

(58) Field of Classification Search .......... 250/281–300
See application file for complete search history.

(56) References Cited

U.S. PATENT DOCUMENTS 3,984,692 A 10/1976 Arsenault
3,992,632 A 11/1976 Kruger et al.
4,105,916 A 8/1978 Siegel
5,015,848 A * 5/1991 Bomse et al. ............... 250/281
5,245,192 A 9/1993 Houseman
5,777,205 A 7/1998 Nakagawa et al.
6,253,162 B1 6/2001 Jarman et al.
6,487,523 B2 11/2002 Jarman et al.
6,541,765 B1 4/2003 Vestal (Continued)

FOREIGN PATENT DOCUMENTS

GB 2363249 A 12/2001

OTHER PUBLICATIONS

International Search Report (PCT/US04/12849, filed Apr. 26, 2004).

(Continued)

*Primary Examiner*—Jack I Berman
*Assistant Examiner*—Andrew Smyth
(74) *Attorney, Agent, or Firm*—Wells St. John P.S.

(57) ABSTRACT

Analysis methods are provided that include generating a sample data set using a sample, the sample data set comprising first and second data sets, wherein each of the first and second data sets comprises at least one of an analytical parameter and a sample characteristic acquired using the analytical parameter; and using the first and the second data sets, identifying the sample. Instruments including an ionization source configured to apply different ionization energies to a sample to provide different sample characteristics, and processing circuitry configured to process the different sample characteristics to identify the sample are provided.

36 Claims, 6 Drawing Sheets

U.S. PATENT DOCUMENTS

| | | | | |
|---|---|---|---|---|
| 6,677,582 | B2 * | 1/2004 | Yamada et al. | 250/288 |
| 6,717,130 | B2 | 4/2004 | Bateman et al. | |
| 7,138,626 | B1 * | 11/2006 | Karpetsky | 250/288 |
| 7,388,197 | B2 * | 6/2008 | McLean et al. | 250/293 |
| 2002/0063206 | A1 * | 5/2002 | Bateman et al. | 250/281 |
| 2002/0146838 | A1 * | 10/2002 | Singh et al. | 436/173 |
| 2002/0190201 | A1 * | 12/2002 | Yamada et al. | 250/288 |
| 2006/0243901 | A1 * | 11/2006 | Barket et al. | 250/288 |
| 2006/0249671 | A1 * | 11/2006 | Karpetsky | 250/288 |
| 2006/0255258 | A1 * | 11/2006 | Wang et al. | 250/282 |

OTHER PUBLICATIONS

Written Opinion of International Searching Authority (PCT/US04/12849, filed Apr. 26, 2004).

International Preliminary Report on Patentability (PCT/US04/012849), Nov. 10, 2005.

Ethan R. Badman and R. Graham Cooks, "*Cylindrical Ion Trap Array with Mass Selection by Variation in Trap Dimensions*" Anal. Chem 2000, 72, 5079-5086.

* cited by examiner

60

SAMPLE DATA SET

| | DATA SET | IONIZATION ENERGY | TOTAL ION CURRENT | |
|---|---|---|---|---|
| 62 → | 1 | 10eV | 80 | |
| 64 → | 2 | 70eV | 500 | |
| | 3 | ••• | ••• | |
| | 4 | ••• | ••• | |
| | ••• | ••• | ••• | |

80

SAMPLE DATA SET

| | DATA SET | IONIZATION ENERGY | MASS SEPARATION RANGE | MASS SPECTRA |
|---|---|---|---|---|
| 82 → | 1 | 10eV | 5–100 |  |
| 84 → | 2 | 70eV | 5–100 |  |
| | 3 | • • • | • • • | |
| | 4 | • • • | • • • | |
| | • • • | • • • | • • • | |

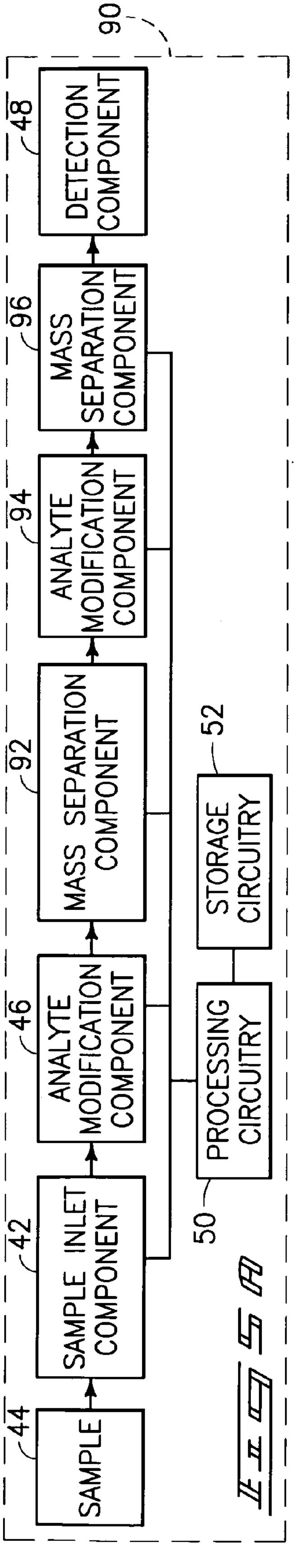
FIG. 5A
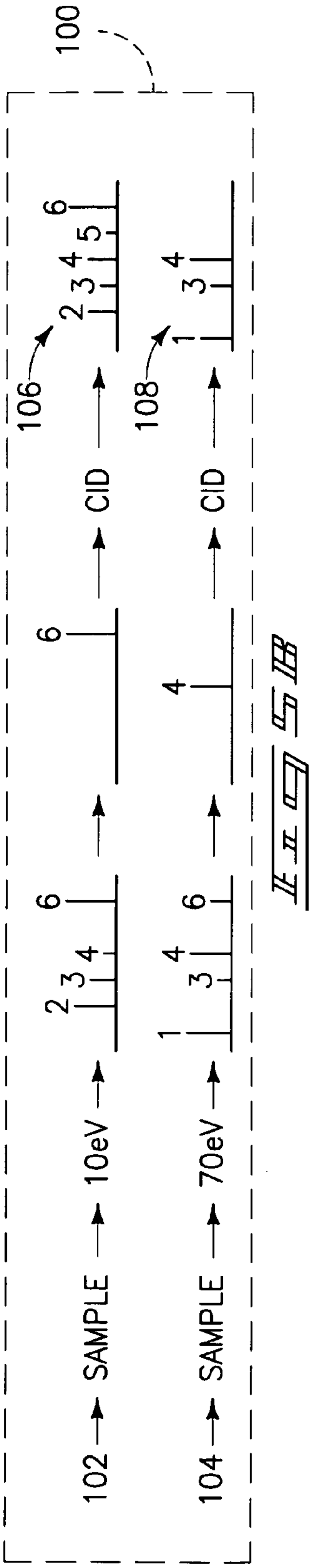
FIG. 5B
110
| DATA SET | FIRST IONIZATION ENERGY | FIRST MASS SEPARATION PARAMETER RANGE | FIRST MASS SEPARATION PARAMETER ISOLATION | SECOND IONIZATION COMPONENT | SECOND MASS SEPARATION PARAMETER RANGE | MASS SPECTRA |
|---|---|---|---|---|---|---|
| 112 → 1 | 10eV | 1–6 | 6 | CID | 1–6 | 2 3 4 6 |
| 114 → 2 | 70eV | 1–6 | 4 | CID | 1–6 | 1 3 4 |
| 3 | ••• | ••• | ••• | ••• | ••• | ••• |
FIG. 5C

INSTRUMENTATION, ARTICLES OF MANUFACTURE, AND ANALYSIS METHODS

CLAIM FOR PRIORITY

This application claims priority to U.S. provisional patent application Ser. No. 60/465,367 filed Apr. 25, 2003, entitled "Mass Spectrometry Instruments and Methods", the entirety of which is hereby incorporated by reference.

RELATED PATENT DATA

This application is a 35 U.S.C. §371 of and claims priority to PCT International Application Number PCT/US04/12849, which was filed Apr. 26 2004, and was published in English, which claims priority under 35 U.S.C. §119 to U.S. Provisional Patent Application No. 60/465,367 which was filed 25 Apr. 2003, the entirety of each are incorporated herein by reference.

TECHNICAL FIELD

The present disclosure relates generally to instrumentation, articles of manufacture, and analysis methods and more particularly to mass spectrometer instrumentation, articles of manufacture comprising digital data, and mass spectrometry methods.

BACKGROUND ART

Analytical instruments and methods are representative of analytical tools that can be used for the identification of unknown samples. Typical analytical instruments and methods can provide at least one level of analysis of a sample.

As an exemplary analytical method, mass spectrometry is perhaps the most widely applicable of all analytical tools available to scientists in the sense that it is capable of providing qualitative and quantitative information about the composition of both inorganic and organic samples. Mass spectrometry can be used to determine the structures of a wide variety of complex molecular species. This analytical technique can also be utilized to determine the structure and composition of solid surfaces as well.

As early as 1920, the behavior of ions in magnetic fields was described for the purposes of determining the isotopic abundances of elements. In the 1960's, a theory describing fragmentation of molecular species was developed for the purpose of identifying structures of complex molecules. In the 1970's, mass spectrometers and new ionization techniques were introduced providing high-speed analysis of complex mixtures and thereby enhancing the capacity for structure determination.

The description provides instrumentation, articles of manufacture, and analysis methods that, in some embodiments, can be utilized to identify unknown samples.

SUMMARY

In one embodiment, analysis methods are provided that include, providing a sample, generating a sample data set using the sample, the sample data set comprising first and second data sets, wherein each of the first and second data sets comprises at least one of an analytical parameter value and a sample characteristic acquired using the analytical parameter value, wherein the analytical parameter value of the first set is different than the analytical parameter value of the second set; and using the first and the second data sets, identifying the sample.

In one embodiment instruments are provided that include: an ionization source configured to apply different ionization energies to a sample to provide different sample characteristics; and processing circuitry configured to process the different sample characteristics to identify the sample.

BRIEF DESCRIPTION OF THE DRAWINGS

Preferred embodiments of the invention are described below with reference to the following accompanying drawings.

FIG. 5*a* is a functional block diagram of a mass spectrometry instrument according to an embodiment.

FIG. 5*b*. are illustrative sample analysis utilizing the instrument of FIG. 5*a* according to an embodiment.

FIG. 5*c* is an illustrative representation of data acquired utilizing the instrument of FIG. 5*a* according to an embodiment.

DESCRIPTION OF THE EMBODIMENTS

At least some embodiments provide analytical instruments including mass spectrometers as well as articles of manufacture and sample analysis methods. Exemplary configurations of these instruments, articles, and methods are described with reference to FIGS. 1-7.

Figure 1:
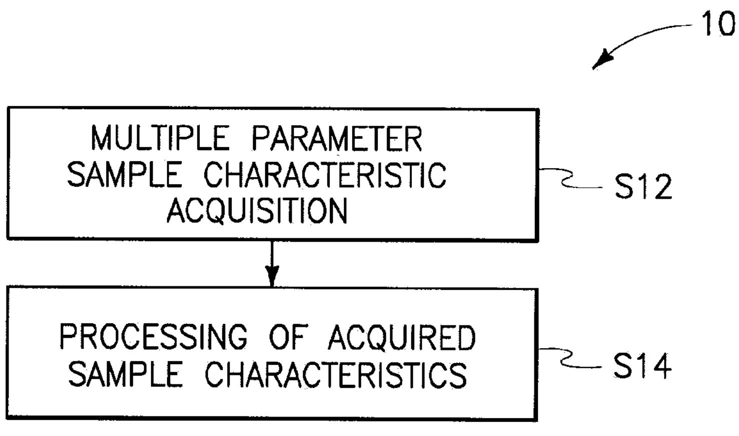
FIG. 1 is a flowchart of an analytical method according to an embodiment.

Referring first to FIG. 1, a general flowchart 10 which may be performed by an analytical instrument and having step 12 and step 14 is shown. Step 12 includes multiple parameter sample characteristic acquisition. Typically analytical instruments include one or more analytical components and these analytical components are configured to acquire sample characteristics according to a predefined analytical or acquisition parameter having a value.

Exemplary analytical instruments include mass spectrometry instruments. Exemplary analytical components of mass spectrometry instruments include sample inlet components, analyte modification components, mass separation components, and detection components. An exemplary analytical parameter of the analyte modification component of a mass spectrometry instrument can include ionization energy and ionization energy can have a value. Exemplary sample characteristics acquired using a mass spectrometry instrument include mass spectra of the sample. As will be discussed below, sample characteristics can be acquired utilizing different or multiple acquisition parameter values.

Figure 2:
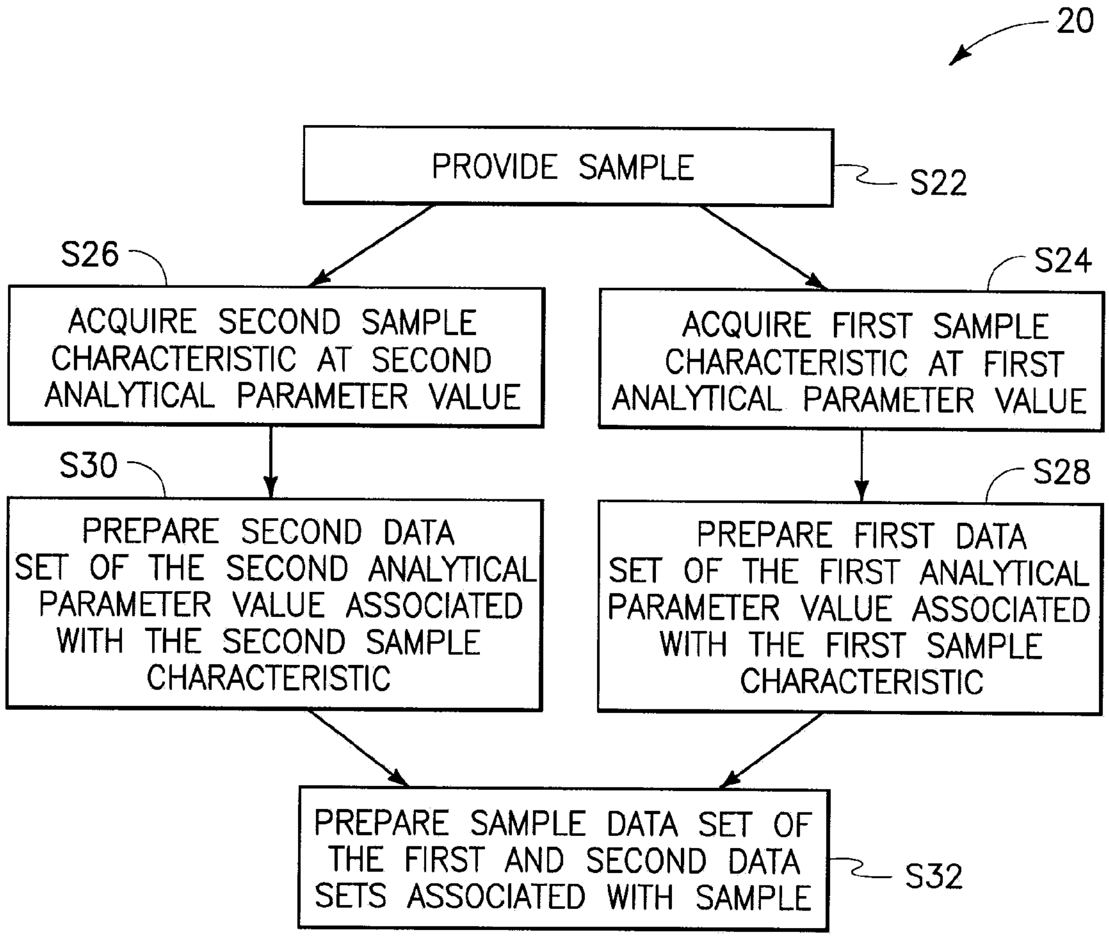
FIG. 2 is a flowchart of an analytical method according to an embodiment.

Referring next to FIG. 2 an embodiment of step 12 is shown as sample characteristic acquisition flowchart 20. As exemplified in flowchart 20 sample characteristic acquisition can take place through multiple steps with a first step 22 including providing a sample. For purposes of this disclosure, the sample represents any chemical composition including both inorganic and organic substances in solid, liquid, and/or vapor form. Specific examples of samples suitable for analysis include volatile compounds such as toluene, or other specific examples including highly complex non-volatile protein based structures such as bradykinin. In certain aspects the sample can be a mixture containing more than one substance or in other aspects the sample can be a substantially pure substance. The sample may be of a known composition and as such, referred to as a known or reference sample. Analysis of the sample can be performed according to exemplary aspects described below.

Figures 3A, 3B:
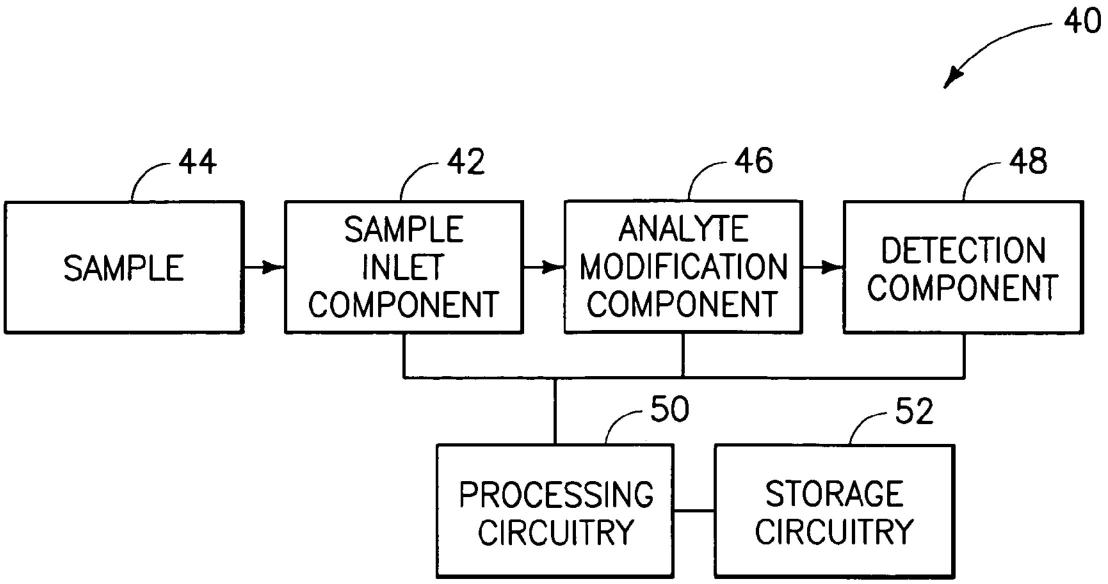
FIG. 3*a* is a functional block diagram of a mass spectrometry instrument according to an embodiment.
FIG. 3*b* is an illustrative representation of data acquired utilizing the instrument of FIG. 3*a*. according to an embodiment.

After step 22, step 24 provides for acquiring a first sample characteristic at a first analytical parameter value. Referring to FIG. 3*a*, an exemplary instrument 40 according to one embodiment is shown that may be utilized in accordance with step 24 of FIG. 2. Instrument 40 may include a sample inlet component 42 configured to receive the sample 44 and convey sample 44 to an analyte modification component 46. Instrument 40 also includes a detection component 48 and processing circuitry 50 that may be coupled to one or more of sample inlet component 42, analyte modification component 46, detection component 48, and/or storage circuitry 52.

Sample 44 can be introduced into sample inlet component 42. Sample inlet component 42 can be configured to introduce an amount of sample 44 into instrument 40 for analysis. Depending upon sample 44, sample inlet component 42 may be configured to prepare sample 44 for introduction into additional analytical components such as analyte modification components and detection components. Types of sample inlets include batch inlets, direct probe inlets, chromatographic inlets, and permeable, semi-permeable, solid phase micro extractions (SPME) and/or capillary membrane inlets. Sample inlet component 42 can also be configured to prepare sample 44 for analysis in the gas, liquid and/or solid phase. Sample inlet component 42 can be configured to provide sample 44 according to sample inlet parameters.

In an exemplary embodiment, sample inlet component 42 can be a chromatographic inlet and the sample inlet parameter of the chromatographic inlet can be a parameter than influences elution of sample 44 or portions of sample 44 from the chromatographic inlet. In one aspect, where the chromatographic inlet is a gas chromatographic inlet, an exemplary sample inlet parameter can include the temperature value of a chromatography column of the gas chromatographic inlet. In some configurations, sample inlet component 42 may be combined with analyte modification component 46. Sample inlet component 42 can be configured to provide sample 44 to instrument 40 according to multiple configurations. For example sample inlet component 42 can be configured as a liquid chromatograph to acquire a first data set in one instance and configured as a gas chromatograph to acquire a second data set in another instance.

Analyte modification component 46 can be configured in exemplary embodiments to receive sample 44 directly or in other exemplary embodiments to receive sample 44 from sample inlet component 42. Analyte modification component 46 can be any component configured to modify an analyte upon exposure of the analyte to the analyte modification component. For example, analyte modification component 46 can be configured as an ionization component to process/ionize sample 44 according to one or more parameters to form ionized analytes. In this configuration, analyte modification component parameters include ionization parameters that can include parameters that affect one or more of the amount of ionization, dissociation, and/or fragmentation of sample 44 when exposed to analyte modification component 46. In an embodiment analyte modification component 46 is configured to provide first and second ionization parameter values. The formation of ionized analytes from sample 44 can include the bombardment of sample 44 with electrons, ions, molecules and/or photons. The formation of ionized analytes within analyte modification component 46 can also be preformed by thermal or electrical energy according to the ionization parameter and its value.

Analyte modification component 46 may be configured as, for example, an electron ionization component (EI, typically suitable for gas phase ionization), a photo ionization component (PI), a chemical ionization component, collisionally activated dissociation component (CID), electrospray ionization (ESI), and/or Flame Ionization. Other configurations are contemplated including analyte derivitisation components such as chemical derivitisation components for use in combination with gas chromatography and liquid chromatography. Furthermore, embodiments are contemplated that include analyte modification component 46 configured as multiple components such as both an electron impact ionization source and a chemical ionization source. Other contemplated embodiments include acquiring a data set with analyte modification component 46 configured in one configuration and acquiring another data set with analyte modification component in another configuration. For example a data set can be acquired with analyte modification component 46 configured as electron ionization component and another data set can be acquired with analyte modification component 46 configured as chemical ionization component.

In one aspect, when the analyte modification component is configured as an ionization component it can be configured provide an ionization component parameter value. An exemplary ionization component parameter value that may be provided by analyte modification component 46 is the amount of ionization energy provided to sample 44. And upon providing one amount of ionization energy at least one ionized analyte or analytes can be formed and upon providing another amount of ionization energy another analyte or analytes can be formed. In reaction form, this is demonstrated by equation 1 below:

$$M+E.\rightarrow .M^{+*}+E'\rightarrow M^{+}+F^{+}+N+E'' \quad (1)$$

wherein M represents the neutral analyte, E represents the energy provided to M; $M^{+*}$ represents an internally excited ion; E' represents any E not deposited into $M^{+*}$ as internal or kinetic energy; $M^+$, $F^+$ and N represent charged analyte, charged dissociation products, and neutral dissociation products, respectively; and E'' represents any E not remaining in $M^+$, $F^+$ or N as internal or kinetic energy. In one embodiment anayte modification component 46 can impact the amount of dissociation of sample into these other molecules ($F^+$ and N).

According to one aspect, a first ionization parameter value can include the ionization energy of an electron ionization source, a second ionization parameter value can include the ionization energy of the electron ionization source, and the first ionization energy can be less than the second ionization energy.

In an exemplary embodiment, analyte modification component 46 can be configured as an electron impact ionization component and an analyte modification parameter value of the electron impact ionization component can be the amount of energy provided by the electron impact ionization component. One exemplary impact ionization component parameter value that may be utilized is an electron impact energy of about 10 eV to form an ionized analyte or group of ionized analytes. Another exemplary impact ionization component parameter value that may be utilized is an electron impact energy of ionization of about 70 eV to form another ionized analyte or group of ionized analytes.

In an exemplary embodiment, analyte modification component 46 can be configured as a photo ionization component and an analyte modification parameter value of the photo ionization component can be a parameter that influences the formation of ionized analytes of sample 44. For example, analyte modification parameter value can be a photo energy of the photo ionization component that can be applied at different values to vary the internal energy of the sample and provide ionized analytes having different characteristics.

In another exemplary embodiment, analyte modification component 46 can be configured as an electrospray ionization component and the analyte modification parameter value of the electrospray ionization component can be a parameter that influences the formation of ionized analytes of sample 44. For example, one electrospray ionization component parameter that can be applied at different values and provides differing ionized analytes from the same sample is the pressure value under which the electrospray ionization component processes the sample. Another electrospray ionization component parameter that can be applied at different values and provides differing ionized analytes from the same sample is the potentials applied when transporting ions from the atmospheric pressure into the vacuum of instrument 40 (often referred to as "nozzle/skimmer" or "cone voltage" disassociation).

Analytes modified in analyte modification component 46 can be detected in detection component 48. Exemplary detection components include electron multipliers, Farady cup collectors, photographic, scintillation-type detectors, UV, UV-vis, diode-array, thermal conductivity, atomic adsorption, FID's. In an exemplary embodiment detection of these modified analytes can indicate the characteristics of sample 44 referred to as sample characteristics. In one embodiment, sample characteristics can be acquired and correlated with respective ones of different values of an analytical parameter used to acquire the characteristic (e.g., ionization energy applied to the sample). At least one sample characteristic that can be recorded includes total ion current in one embodiment.

In one embodiment, the progression of mass spectrometry analysis from sample inlet component 42 through analyte modification component 46 to detection component 48 can be controlled and/or monitored by processing circuitry 50 in the described exemplary embodiment. Processing circuitry 50 may be implemented as a processor or other structure configured to execute executable instructions including, for example, software and/or firmware instructions. Other exemplary embodiments of processing circuitry 50 include hardware logic, PGA, FPGA, ASIC, and/or other structures. These examples of processing circuitry 50 are for illustration and other configurations are possible.

Processing circuitry 50 can be configured to control the values of analytical component parameters described above and monitor detection component 48. Control of the analytical component parameter values by processing circuitry 50 can include, for example, dictating a predefined application of ionization energy by analyte modification component 46. In one embodiment, processing circuitry 50 can be configured to control analyte modification component 46. In an exemplary aspect, processing circuitry 50 can dictate a value of an analyte modification parameter during a first moment in time and a different analyte modification parameter during a second moment in time. Exemplary monitoring includes the recording of data received from detection component 48. By varying analytical component parameter values utilized as described sample characteristics can be obtained and associated with the parameter values and provided in the form of respective data sets according to the different values.

In one aspect processing circuitry 50 may execute data acquisition and searching programming and be configured to perform data acquisition and searching that includes the acquisition of sample characteristics such as total ion current or mass spectra. In another aspect, processing circuitry 50 can be configured to associate detected sample characteristics such as total ion current responsive to one or more analytical parameters such as an ionization parameter including electron impact ion source energy. Processing circuitry 50 can be configured to monitor detection component 48 and associate detection of first analytes with a first sample characteristic and detection of second analytes with a second sample characteristic. Processing circuitry 50 may also be configured to associate both the first sample characteristic with the first value of the analytical parameter, and the second sample characteristic with the second value of the analytical parameter. In an exemplary embodiment processing circuitry 50 can be configured to correlate both the first value of analyte modification parameter provided from analyte modification component 46 with the analytes detected during the first moment in time, and the second value of the analyte modification parameter provided from analyte modification component 46 with the analytes detected during the second moment in time. Processing circuitry 50 can also be configured to prepare a sample data set that may include first and second data sets corresponding to the respective values.

Referring again to FIG. 2, after step 24, step 28 provides for preparing a first data set of the first analytical parameter value associated with the first sample characteristic acquired in step 24 and step 30 provides for preparing a second data set of the second analytical parameter value associated with the second sample characteristic acquired in step 26. Following steps 28 and 30 of flowchart 20, step 32 provides for the preparation of sample data sets of the first and second data sets prepared in steps 28 and 30 respectively. In an exemplary embodiment, sample data sets acquired by analyzing reference samples may be referred to as reference data sets and sample data sets acquired by analyzing unknown samples may be referred to as unknown sample data sets.

Referring to FIG. 3*b*, an exemplary sample data set 60 is shown that includes a first data set 62 and a second data set 64. Sample data set 60 can include additional data sets as well. First and second data sets 62 and 64 may correspond to different values of an analytical parameter. According to the exemplary embodiment depicted in FIG. 3*b*, the analytical parameter is the ionization energy of analyte modification component 46 and the sample characteristic is the total ion current detected by detection component 48. As further depicted in FIG. 3*b*, sample data set 60 includes values of the analytical parameter that are not equal.

Referring again to FIG. 3*a*, processing circuitry 50 can be configured to store and access data from storage circuitry 52. Storage circuitry 52 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, and infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Storage circuitry 52 may store a plurality of data sets including first and second sets of data. In exemplary embodiments, the first set of data can include a plurality of sample characteristics obtained by a given value of a parameter as described above. The second set of data can include a plurality of sample characteristic obtained by a different value of the parameter as described above. As described above, these sample characteristics can include mass spectra and the parameter values which may be varied can include one or more of inlet, analyte modification, and/or detection component parameters. In exemplary embodiments these data sets are associated by a sample. According to one aspect, the first and second sample characteristics can be of the same sample and according to an exemplary embodiment, the value of the acquisition parameters of the first set can be different than the value of the acquisition parameters of the second set.

Figure 4A:
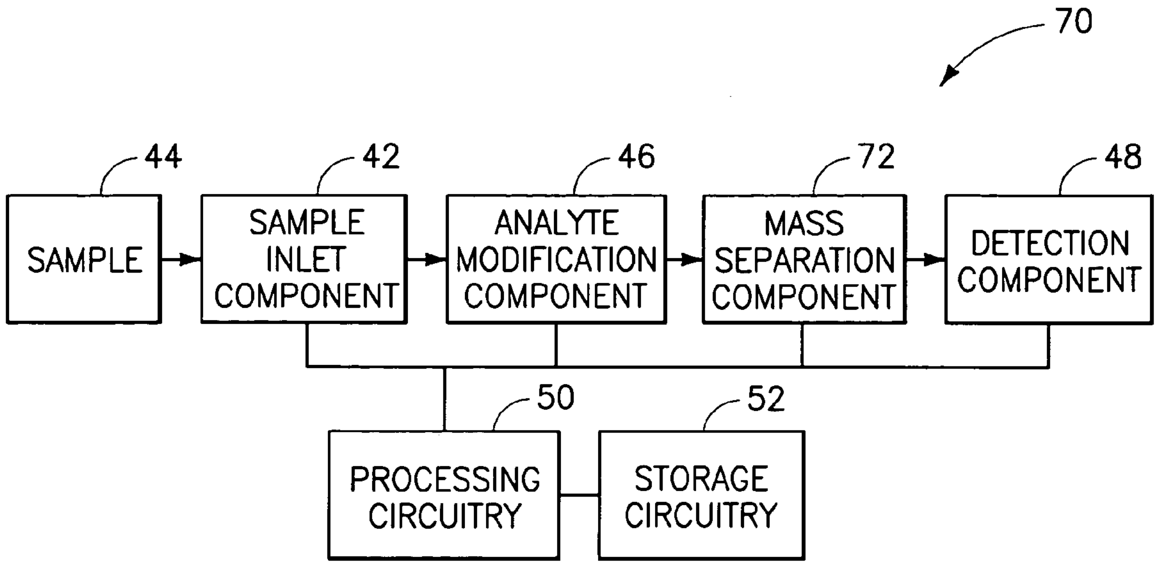
FIG. 4*a* is a functional block diagram of a mass spectrometry instrument according to an embodiment.

Referring next to FIG. 4*a,* according to another embodiment, an instrument 70 is shown that includes mass separation component 72 coupled to analyte modification component 46 and detection component 48. Instrument 70 includes processing circuitry 50 that can be coupled to mass separation component 72. As exemplified processing circuitry 50 can be utilized to control mass separation component 72 and in an exemplary embodiment allow ionized analytes of a predetermined mass-to-charge ratio to proceed to detection component 48 for detection.

Mass separation component 72 can include one or more of linear quadrupoles, triple quadrupoles, quadrupole ion traps (PAUL), cylindrical ion traps, linear ion traps, rectal linear ion traps, ion cyclotron resonance, quadrupole ion trap, time-of-flight mass spectrometers, ion mobility or other structures. Mass separation component 72 can also include focusing lens as well as tandem mass separation components such as tandem ion traps or an ion trap and quadrupole ion trap in tandem.

In one implementation at least one of multiple tandem mass separation components can be an ion trap. Tandem mass separation components can be placed in series or parallel. In an exemplary implementation, tandem mass separation components can receive ions from the same analyte modification component 46. In an exemplary aspect the tandem mass separation components may have the same or different geometric parameters. The tandem mass separation components may also receive analyte ions from the same or multiple ionization components.

An exemplary mass separation component 72 useful in accordance with one embodiment is a cylindrical ion trap (CIT). CIT's typically include three components; a trapping volume, and two endcaps. Typically an AC current or RF voltage is applied to the trapping volume at a predefined rate (e.g., controlled by 50) to eject trapped analytes which are subsequently detected. RF voltage ramps may include variables such as power and/or frequency. Combinations of these variables in predefined amounts are typically referred to as waveforms. Generally, waveforms can be optimized to increase detection of specific analytes of interest. Waveforms can also be optimized to allow for multiple stages of mass analysis.

In an exemplary embodiment, mass separation component 72 can be a cylindrical ion trap and the mass separation parameter of the cylindrical ion trap can be a parameter than influences the mass-to-charge ratio of ionized analytes received by detection component 48. An exemplary cylindrical ion trap parameter value that influences the mass-to-charge ratio of ionized analytes received by detection component 48 is a mass-to-charge ratio range that can be specified as waveform values.

Utilizing mass separation component 72 in conjunction with analyte modification component 46, detection component 48, and processing circuitry 50, sample characteristics of sample 44 may be obtained that can include mass spectra. Mass spectra is another sample characteristic that can be associated with values of an analytical parameter such as sample inlet component, analyte modification component, and/or detection component parameter values.

Sample data sets acquired using instrument 70 can include mass spectra as a sample characteristic of first and second ionized analytes detected. Processing circuitry 50 can be configured to associate the ionized analytes detected with the different values of the analytical parameters provided by analytical components such as sample inlet component 42 (e.g., chromatography temperatures), analyte modification component 46 (e.g., ionization energies), and separation component 72 (e.g., waveforms). Processing circuitry 50 can also be configured to associate a group of analytes detected with the analytical parameter values utilized by instrument 70. Processing circuitry 50 can also, at a first moment in time, control mass separation component 72 to provide a first mass separation parameter value that may include a specific mass-to-charge ratio or range of ratios of analytes to proceed to mass detection component 48. Processing circuitry 50 may be configured to acquire sample data sets during this first moment in time that can comprise a first data set of sample characteristics that are associated with acquisition parameters that can include one or more of first sample inlet, analyte modification, and mass separation parameters and values of the respective parameters.

Processing circuitry 50 may also control analyte modification component 46 to provide a second ionization parameter value at a second moment in time and control mass separation component 72 to provide a second mass separation parameter value at that second moment in time that can include allowing specific mass-to-charge ratio or range of ratios of analytes to proceed to mass detection component 48. Data received from detection component 48 during the second moment in time by processing circuitry 50 can include a second data set of sample characteristics that are associated with respective values of acquisition parameters that can include second sample inlet, analyte modification, and mass separation parameters and values of the respective parameters.

Figure 4B:
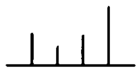
FIG. 4*b* is an illustrative representation of data acquired utilizing the instrument of FIG. 4*a* according to an embodiment.
Figure 4B:
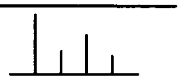

Referring to FIG. 4*b*, an exemplary data set 80 is shown. Data set 80 includes exemplary data acquired using instrument 70. Data set 80 includes first data set 82 and second data set 84. First data set 82, as exemplarily depicted includes the the analyte modification parameter value of 10 eV, the mass separation parameter mass-to-charge ratio range value of 5-100 m/z, and the sample characteristic mass spectra shown. Second data set 84, as exemplarily depicted includes the analyte modification parameter value of 70 eV, the mass separation parameter mass-to-charge ratio range value of 5-100 m/z, and the sample characteristic mass spectra shown. As exemplified by data set 80, the analyte modification parameter values are different in that the ionization energy at 10 eV is lower than the ionization source energy at 70 eV. According to the exemplary embodiment of FIG. 4*a,* storage circuitry 52 can be configured to store and provide access to data set 80.

Referring next to FIG. 5*a,* an instrument 90 is shown configured as a mass spectrometer having a mass separation component 92, an analyte modification component 94, and a mass separation component 96 in addition to previously detailed components. The configuration of instrument 90 is sometimes referred to as a MS/MS or a tandem mass separator configuration.

As exemplarily depicted in FIG. 5*a,* analyte modification component 46 can be configured to receive sample 44 directly or via sample inlet component 42 and provide, in one embodiment, an ionization energy to sample 44 to form a group of ionized analytes. In an exemplary aspect, analyte modification component 46 can be configured to provide a ionization energy to sample 44 to form a first group of ionized analytes. Analyte modification component 46 can also be configured to provide a second ionization energy to sample 44 to form a second group of ionized analytes. Mass separation component 92 can be configured to receive the first and second groups of ionized analytes and provide both a first separation waveform to separate a first mass-to-charge ratio range of the first group of ionized analytes, and provide a second separation waveform to separate a second mass-to-charge ratio range of the second group of ionized analytes. Analyte modification component 94 can be configured to receive the first and second ranges of ionized analytes and provide both a third analyte modification component parameter value to the first and second ranges of ionized analytes to form a third group of ionized analytes, and provide a fourth analyte modification component parameter value to the ranges to form a fourth group of ionized analytes. Mass separation component 96 can be configured to receive the third and fourth groups of ionized analytes and provide both a third separation waveform to separate a third mass-to-charge ratio range of the third group of ionized analytes and provide a fourth separation waveform to separate a fourth mass-to-charge ratio range of the fourth group of ionized analytes. In an exemplary aspect, at least one of the first and second parameter values of one of the analyte modification component parameter values or the separation component parameter values are not equal.

Detection component 48 can be configured to detect the ionized analytes of the third and fourth ranges received from mass separation component 96. Processing circuitry 50 can be configured to monitor detection component 48 and control the application of analytical parameters described above when utilizing instrument 90. Processing circuitry 50 may also be configured to associate detection of ionized analytes of the third range with a first sample characteristic and associate detection of ionized analytes of the fourth range with a second sample characteristic. According to an exemplary aspect, the first and second sample characteristics can be mass spectra and these mass spectra can be associated with analytical parameters utilized during their generation. For example, processing circuitry 50 can be configured to associate both the first mass spectra with one or more of the first ionization energy, the first mass separation waveform, the third energy and the third mass separation waveform. Processing circuitry 50 can also be configured to associate the second mass spectra with one or more of the second ionization energy, the second mass separation waveform, fourth energy, and the fourth separation waveform.

While embodiments of analytical instruments have been shown and described in FIGS. 3*a,* 4*a,* and 5*a,* alternative embodiments are contemplated. For example the instruments and methods described herein can be configured to obtain sample characteristics other than mass spectra, instruments configured to obtain sample characteristics including NMR, IR, atomic adsorption, liquid and gas chromatography, and other analytical characteristics are contemplated. With respect to the various components discussed above other component are contemplated as well. For example ion mobility spectrometry components are contemplated as well as liquid and gas chromatography. Furthermore, various orders of components and types of components are contemplated as well. For example different sample inlet components may be utilized to obtain different sample characteristics and these different sample inlet components can be used in combination with the same or different analyte modification components, and the same or different mass separation and detection components.

Referring to FIG. 5*b* an exemplary data acquisition 100 is shown that includes exemplary acquisitions 102 and 104. Acquisition 102 includes ionization of sample 44 at a first ionization energy of 10 eV followed by ion trap mass separation and isolation of an exemplary first ionized analyte having a m/z ratio of 6. Acquisition 102 further includes exposure of the first ionized analytes to collisionally induced dissociation (CID) and the detection of mass spectra 106 representing the sample characteristic of sample 44 as acquired using the parameters of acquisition 102. Acquisition 104 includes ionization of sample 44 at a second ionization energy of 70 eV followed by ion trap mass separation and isolation of an exemplary second ionized analyte having a m/z ratio of 4. Acquisition 104 further includes exposure of the second ionized analyte to CID and the detection of mass spectra 108 representing the sample characteristic of sample 44 as acquired using the parameters of acquisition 102. Mass spectra 106 and 108 can be associated with their respective acquisition parameters utilized, to form a sample data set.

Referring to FIG. 5*c,* exemplary data set 110 is shown. Data set 110 includes exemplary data acquired using instrument 90. Data set 110 includes a first data set 112 and a second data set 114. First data set 112, as exemplarily depicted, includes a plurality of acquisition parameters that include a first analyte modification parameter value of 10 eV, first mass separation parameters that include a mass-to-charge ratio range of 1-6 m/z and an ion trap isolation m/z of 6, a second analyte modification component that includes a CID, a second mass separation parameter mass-to-charge ratio range of 1-6 m/z, and the sample characteristic mass spectra shown. Second data set 114, as exemplarily depicted, includes a plurality of acquisition parameters that include a first analyte modification parameter value of 70 eV, first mass separation parameters that include a mass-to-charge ratio range of 1-6 m/z and an ion trap isolation m/z of 4, a second analyte modification component that includes a CID, a second mass separation parameter mass-to-charge ratio range of 1-6 m/z, and the sample characteristic mass spectra shown. As exemplified by data set 110, the analytical parameters of analyte modification are different in that the first analyte modification parameter value of 10 eV in set 112 is lower than the first analyte modification parameter value of 70 eV in set 114 and the isolation m/z of first data set 112 is 6 m/z and second data set 114 is 4 m/z. Data sets such as data set 110 can be stored by storage circuitry 52.

Figure 6:
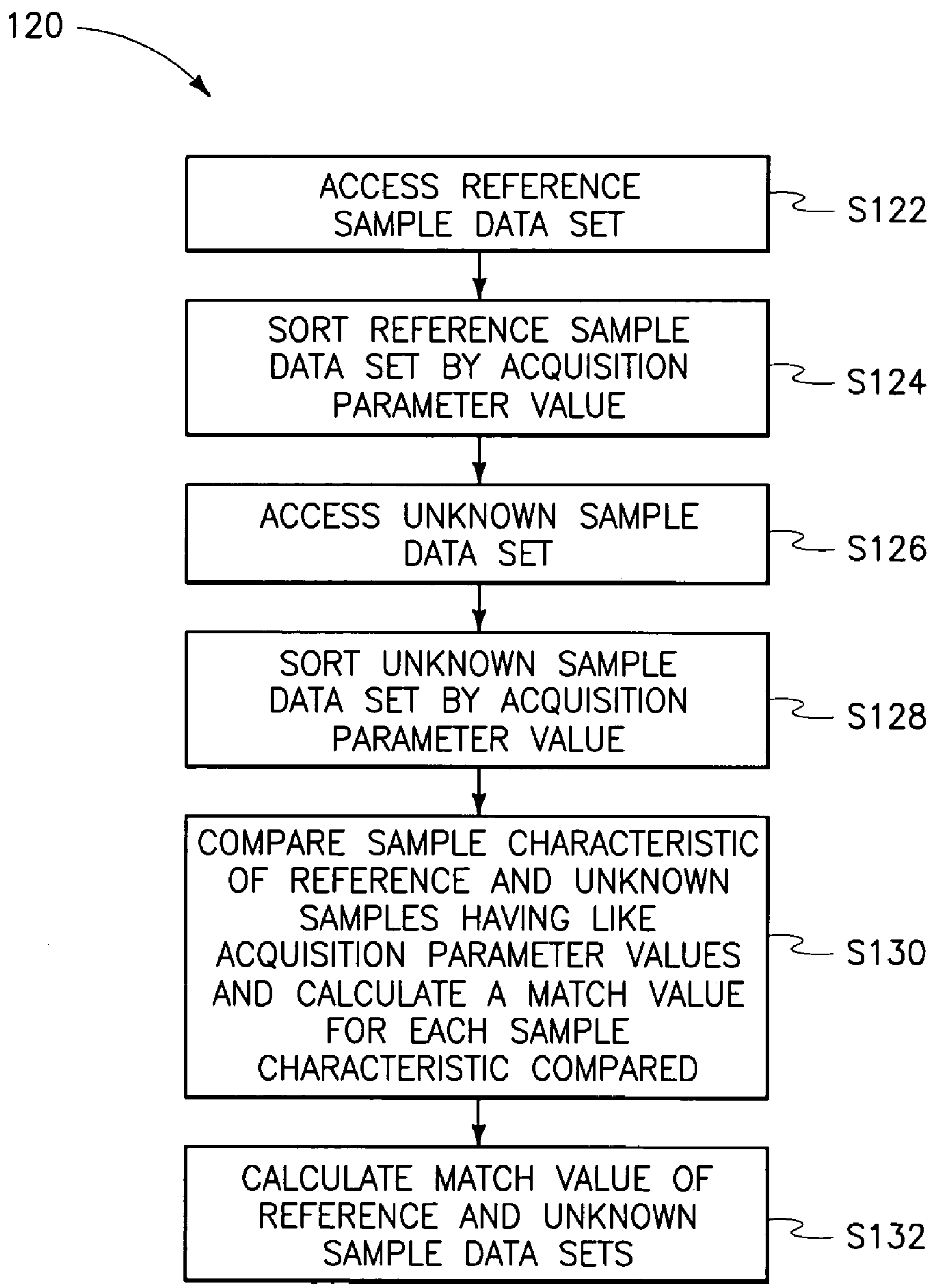
FIG. 6 is a flowchart of a data processing method according to an embodiment.

Referring again to FIG. 1, exemplary flowchart 10 provides for processing of acquired sample characteristics in step 14. Step 14 can include identify a sample being analyzed. Referring next to FIG. 6, processing circuitry 50 can be configured to process the acquired sample characteristics in accordance with step 14 of FIG. 1 as exemplified by flowchart 120. Step 122 provides for accessing reference sample data sets. Reference sample data sets can include data sets as described herein acquired using known samples.

As described above analysis methods are provided that include providing the sample and generating a sample data set using the sample. According to one aspect, the data set can include first and second data sets, with each of the first and second data sets including an analytical parameter value and a sample characteristic acquired using the analytical parameter value. In one aspect, the analytical parameter value of the first set is different than the analytical parameter value of the second set. In one embodiment individual ones of sample characteristics of the first set can be associated with respective individual ones of the sample characteristics of the second set. Some aspects provide for individual ones of the sample characteristics to be associated with a plurality of analytical parameter values. These sample characteristics may be associated by a reference sample. Sample data sets of reference samples may be accessed by process circuitry and utilized to identify unknown samples that are analyzed utilizing like acquisitions parameters. Processing circuitry may access a plurality of these data sets in response to detection of a plurality of analytes generated using predefined acquisition parameters such as those described above.

After step 122, process circuitry can be configured to sort reference sample data sets by acquisition parameter. In an exemplary embodiment, the sorting can include aligning data sets having like acquisition parameter values to facilitate sample characteristic comparison. Following step 124, an unknown sample data set of a sample to be identified can be accessed and in step 128 the unknown sample data set can be sorted by acquisition parameter thereby aligning sample data sets having like acquisition parameters.

In an exemplary aspect, upon accessing and sorting the reference sample data and the unknown sample data sets, the sample characteristics of the reference and unknown sample data having like acquisition parameters can be compared in step 130. In an exemplary embodiment, this comparison can include applying an accepted sample characteristic comparison algorithm to both the unknown and reference sample characteristics. Accepted algorithms provide match values as a product of the comparison. For example, U.S. Pat. No. 6,487,523 to Jarman et al., describes in detail a multi variant calibration and fingerprint matching of mass spectrometry. An exemplary sample characteristic comparison algorithm includes NIST Mass Spectral Search Program which is typically used to compare mass spectra.

Upon completion of step 130, a match value of the reference and sample data sets is calculated in step 132 by accumulating the match values of the plurality of comparisons of the reference sample and sample characteristics acquired utilizing like acquisition parameters. Match values indicating a sufficient match of sample characteristics acquired utilizing one and another analytical component parameter values can be relied upon to identify an unknown sample.

Figure 7:
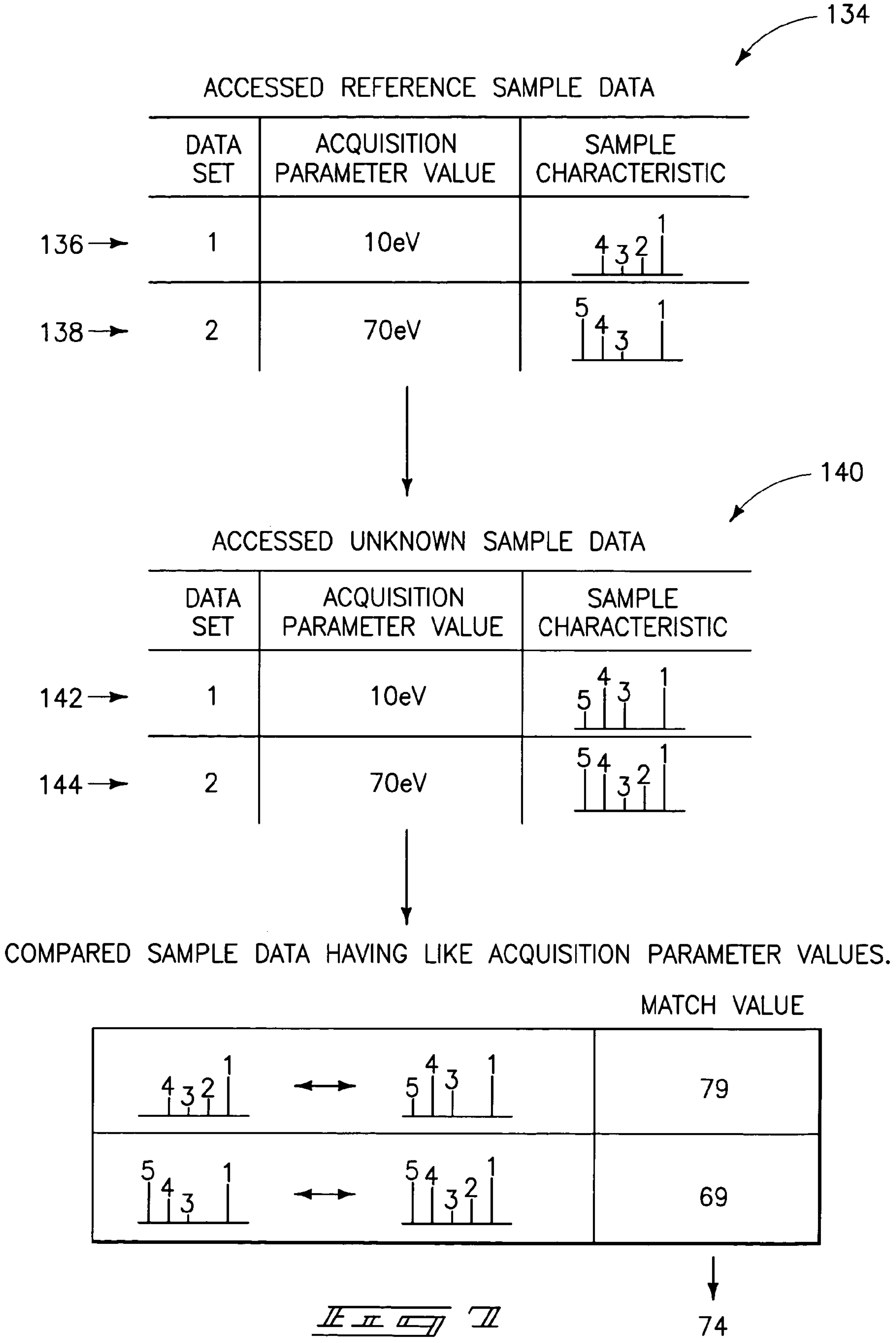
FIG. 7 is an illustrative representation of the data processing method of FIG. 6 according to an embodiment.

Referring to FIG. 7 exemplary reference sample data and acquired sample data are depicted and can be accessed and compared in accordance with flowchart 120 of FIG. 6. In accordance with exemplary step 122 reference sample data 134 is accessed. Data 134 includes data 136 and data 138. Data 136 and 138 both comprise a sample characteristic (e.g., mass spectra) and an acquisition parameter value (e.g., ionization energy). As depicted, data 136 is sorted above data 138. In accordance with exemplary step 126, acquired sample data 140 is accessed. Data 140 includes data 142 and data 144. Data 142 and 144 both comprise a sample characteristic (e.g., mass spectra) and an acquisition parameter value (e.g., ionization energy). As depicted, data 142 is sorted above data 144.

In accordance with step 130 mass spectra of data 136 is then compared with mass spectra of data 142. Mass spectra of data 138 is then compared with mass spectra of data 144. For each comparison a match value is calculated and the calculated match values are summarized. According to one embodiment summarizing includes taking an average of the match values as depicted in FIG. 7. The summarized match values can be relied upon to identify a sample.

What is claimed is:

1. An instrument comprising:

an ionization source configured to apply different ionization energies to a sample to provide different sample characteristics;

processing circuitry configured to process the different sample characteristics to identify the sample;

wherein the processing circuitry is configured to acquire at least two data sets of the different sample characteristics, one of the two data sets of the different sample characteristics comprising a first sample characteristic associated with a first ionization energy and another of the two data sets of the different sample characteristics comprising a second sample characteristic associated with a second ionization energy; and wherein the processing circuitry is further configured to access at least two data sets of reference sample characteristics, one of the data sets of the reference sample characteristics comprising a third reference sample characteristic associated with the first ionization energy and another of the two data sets of the reference sample characteristics comprising a fourth reference sample characteristic associated with the second ionization energy.

2. The instrument of claim 1 wherein the ionization source comprises an electron impact ionization source and one of the ionization energies comprises 70 eV.

3. The instrument of claim 1 wherein at least one of the sample characteristics comprises mass spectra of the sample.

4. The instrument of claim 1 wherein the processing circuitry is further configured to compare the data sets of the different sample characteristics with the data sets of the reference sample characteristics and calculate a match value.

5. A mass spectrometer comprising:

an ionization component configured to receive a sample and provide a first ionization energy to the sample to form a first ionized analyte and provide a second ionization energy to the sample to form a second ionized analyte, wherein the first and second energies are not equal;

a detection component configured to detect the first and second ionized analytes formed by the ionization component;

processing circuitry configured to monitor the detection component and associate detection of the first ionized analytes with a first sample characteristic and associate detection of the second ionized analytes with a second sample characteristic, wherein the processing circuitry is further configured to associate both the first sample characteristic with the first ionization energy, and the second sample characteristic with the second ionization energy to identify a sample;

wherein the sample characteristics comprise mass spectra and the processing circuitry is further configured to prepare a sample data set comprising first and second data sets, the first data set comprising the first mass spectra associated with the first ionization energy and the second data set comprising second mass spectra associated with the second ionization energy; and further comprising storage circuitry comprising media configured to store digital data, wherein the media comprises reference data comprising third and fourth data sets, the third data set comprising a third mass spectra and the first ionization energy and the fourth data set comprising a fourth mass spectra and the second ionization energy, wherein the third mass spectra was acquired at the first ionization energy and the fourth mass spectra was acquired at the second ionization energy.

6. The mass spectrometer of claim 5 wherein the processing circuitry is further configured to compare the sample and reference data, the comparing comprising applying an algorithm to both the mass spectra of the first data set and the third data set, and the mass spectra of the second data set and the fourth data set, the algorithm configured to compare mass spectra and provide a first match value of the mass spectra of the first data set and the mass spectra of the third data set and a second match value of the mass spectra of the second data set and the mass spectra of the fourth data set.

7. The mass spectrometer of claim 6 wherein the processing circuitry is further configured to provide an average of the first match value and the second match value.

8. The mass spectrometer of claim 5 wherein the first ionization energy comprises electron impact ionization energy of about 10 eV and the second ionization energy comprises electron impact ionization energy of about 70 eV.

9. The mass spectrometer of claim 5 wherein the ionization component comprises first and second ionization sources, the first ionization source being configured to provide the first ionization energy and the second ionization source being configured to provide the second ionization energy, wherein the first ionization parameter comprises electron impact ionization energy and the second ionization energy comprises chemical ionization energy.

10. The mass spectrometer of claim 5 wherein:

the ionization component is further configured to provide the first ionization energy to the sample at a first moment in time and the second ionization energy to the sample at a second moment in time; and the processing circuitry is configured to correlate both the first ionization energy provided with the first ionized analytes detected during the first moment in time, and the second ionization energy provided with the second ionized analytes detected during the second moment in time.

11. The mass spectrometer of claim 5 further comprising:

storage circuitry comprising a plurality of data sets, each of the data sets comprising a reference sample characteristic associated with one of the first or second ionization energies; and wherein the processing circuitry component is further configured to access the data sets responsive to the detection of the first and second ionized analytes and determine a match value.

12. A mass spectrometer comprising:

an ionization component configured to receive a sample and provide a first ionization energy to the sample to form a first ionized analyte and provide a second ionization energy to the sample to form a second ionized analyte, wherein the first and second energies are not equal;

a detection component configured to detect the first and second ionized analytes formed by the ionization component;

processing circuitry configured to monitor the detection component and associate detection of the first ionized analytes with a first sample characteristic and associate detection of the second ionized analytes with a second sample characteristic, wherein the processing circuitry is further configured to associate both the first sample characteristic with the first ionization energy, and the second sample characteristic with the second ionization energy to identify a sample;

a mass separation component configured to receive the first and second ionized analytes from the ionization component and provide a first separation waveform to separate a first mass-to-charge ratio range of ionized analytes and provide a second separation waveform to separate a second mass-to-charge ratio range of ionized analytes; and wherein the processing circuitry is further configured to associate both the first sample characteristic with the first mass separation waveform, and the second sample characteristic with the second mass separation waveform; and storage circuitry comprising media configured to store the sample data set and a reference data set, the reference data set comprising third and fourth data sets, the third data set comprising a third sample characteristic of a reference sample associated with the first ionization energy and mass separation waveforms and the fourth data set comprising a fourth sample characteristic of the reference sample associated with the second ionization energy and mass separation waveforms, wherein the third sample characteristic was acquired utilizing the first ionization energy and mass separation waveforms and the fourth sample characteristic was acquired utilizing the second ionization energy and mass separation waveforms.

13. The mass spectrometer of claim 12 wherein the ionization component comprises an electron impact ion source component and the first ionization energy comprises an electron impact energy of about 10 eV and the second ionization energy comprises an electron impact energy of about 70 eV.

14. The mass spectrometer of claim 12 wherein the ionization component comprises an electron impact ion source and the mass separator component comprises an ion trap.

15. The mass spectrometer of claim 12 wherein the processing circuitry is further configured to prepare a sample data set comprising first and second data sets, the first data set comprising the first sample characteristics associated with the first ionization energy and mass separation waveforms and the second data set comprising the second sample characteristic associated with the second ionization energies and mass separation waveforms.

16. The mass spectrometer of claim 12 wherein the mass separation waveforms are not equal.

17. A mass spectrometer comprising:

a first analyte modification component configured to receive a sample and provide both a first ionization energy to the sample to form a first group of ionized analytes, and provide a second ionization energy to the sample to form a second group of ionized analytes;

a first mass separation component configured to receive the first and second groups of ionized analytes and provide both a first separation waveform to separate a first mass-to-charge ratio range of the first group of ionized analytes, and provide a second separation waveform to separate a second mass-to-charge ratio range of the second group of ionized analytes;

a second analyte modification component configured to receive the first and second mass-to-charge ratio ranges of ionized analytes and provide both a third energy to the first and second ranges of ionized analytes to form a third group of ionized analytes, and provide a fourth energy to the ranges to form a fourth group of ionized analytes;

a second mass separation component configured to receive the third and fourth groups of ionized analytes and provide both a third separation waveform to separate a third mass-to-charge ratio range of the third group of ionized analytes and provide a fourth separation waveform to separate a fourth mass-to-charge ratio range of the fourth group of ionized analytes, wherein at least one of the first and second or third and fourth ionization energies, or the first and second or third and fourth separation waveforms are not equal;

a detection component configured to detect the ionized analytes of the third and fourth ranges of ionized analytes received from the second mass separation component; and processing circuitry configured to monitor the detection component and associate detection of ionized analytes of the third range with a first sample characteristic and associate detection of ionized analytes of the fourth range with a second sample characteristic, wherein the processing circuitry is further configured to correlate both the first sample characteristic with one or more of the first ionization energy, the first mass separation waveform, the third energy and the third mass separation waveform, and the second sample characteristic with one or more of the second ionization energy, the second mass separation waveform, fourth ionization energy, and the fourth separation waveform.

18. The mass spectrometer of claim 17 wherein both the first and second analyte modification components comprise electron impact ionization sources and the ionization energy of the first source of the first data set comprises about 10 eV and the ionization energy of the first source of the second data set comprises about 70 eV.

19. The mass spectrometer of claim 18 wherein the second analyte modification component comprises a collisionally induced dissociation source and the third and fourth energies comprise collisionally induced dissociation energies.

20. The mass spectrometer of claim 17 wherein both the first and second mass separation components comprise ion traps.

21. The mass spectrometer of claim 20 wherein the second ion trap is configured to isolate individual analytes of a predefined mass-to-charge ratio.

22. A sample analysis method comprising:

providing a sample;

generating a sample data set using the sample, the sample data set comprising first and second data sets, wherein each of the first and second data sets comprises at least one of an analytical parameter value and a sample characteristic acquired using the analytical parameter value, wherein the analytical parameter value of the first set is different than the analytical parameter value of the second set;

using the first and the second data sets, identifying the sample;

wherein the sample characteristic comprises at least mass spectra and the identifying the sample further comprises:

providing a reference data set comprising third and fourth data sets, the third data set comprising the analytical parameter value of the first set and mass spectra of a reference sample generated using the analytical parameter value of the first set, and the fourth data set comprising the analytical parameter value of the second set and mass spectra of the reference sample generated using the analytical parameter value of the second set; and comparing the sample and reference data sets, the comparing comprising applying an algorithm to both the mass spectra of the first data set and the third data set, and the mass spectra of the second data set and the fourth data set, wherein the algorithm is configured to compare mass spectra and provide a first match value of the mass spectra of the first data set and the mass spectra of the third data set and a second match value of the mass spectra of the second data set and the mass spectra of the fourth data set.

23. The analysis method of claim 22 wherein the generating comprises:

generating a plurality of analytes; and detecting the analytes to generate a plurality of spectra, wherein the sample characteristics comprise the spectra.

24. The analysis method of claim 22 wherein the analytical parameter value a parameter value of one or more of a sample inlet component, an analyte modification component, a mass separation component, and a detection component.

25. The analysis method of claim 24 wherein the analyte modification parameter value comprises an ionization energy applied by an ionization source.

26. The analysis method of claim 25 wherein the analyte modification parameter value of the first data set comprises a first ionization energy and the analyte modification parameter value of the second data set comprises a second ionization energy, wherein the value the first ionization energy is lower than the second ionization energy.

27. The analysis method of claim 22 wherein the analytical parameter value comprises a parameter value of one or more of a sample inlet component, an analyte modification component, a mass separation component, and a detection component and the generating the sample data set comprises:

generating a first plurality of ionized analytes at a first analyte modification parameter value;

separating a first group of the ionized analytes from the plurality at a first mass separation parameter value; and generating a second plurality of ionized analytes from the first group of ionized analytes at a second analyte modification parameter value; and separating a second group of ionized analytes from the second plurality at a second mass separation parameter value, the sample characteristic comprising the spectra of the second group of ionized analytes, wherein the first and second data sets comprise one or more of the first and second analyte modification and mass separation parameter values.

28. The analysis method of claim 27 wherein the first and second mass separation parameters are the same.

29. The analysis method of claim 28 wherein the first mass separation parameter value of the first data set does not equal the first mass separation parameter value of the second data set.

30. The analysis method of claim 27 wherein the mass separation parameter value of the first and second data sets comprises a mass range value.

31. The analysis method of claim 30 wherein the first analyte modification parameter value of the first set does not equal the first mass separation parameter value of the second data set.

32. The analysis method of claim 31 wherein the first analyte modification parameter value of the first and second data sets comprises and ion source energy.

33. The analysis method of claim 27 wherein the first and second mass separation parameters are different.

34. The analysis method of claim 33 wherein the first mass separation parameter value comprises a predefined mass-to-charge ratio isolation value and the second mass separation parameter value comprises a mass-to-charge range.

35. The analysis method of claim 34 wherein the predefined mass-to-charge ratio isolation value of the first set of data does not equal the predefined mass-to-charge ratio isolation value of the second set of data.

36. The analysis method of claim 27 wherein the identifying the sample comprises:

providing a reference data set comprising the sample characteristics of a reference sample and one or more of the first analyte modification parameter value, the second analyte modification parameter value, the first mass separation parameter value, and the second mass separation parameter value; and comparing the reference data set to the sample data set.

* * * * *

UNITED STATES PATENT AND TRADEMARK OFFICE

CERTIFICATE OF CORRECTION

PATENT NO. : 7,462,821 B2
APPLICATION NO. : 10/554039
DATED : December 9, 2008
INVENTOR(S) : Barket, Jr. et al.

It is certified that error appears in the above-identified patent and that said Letters Patent is hereby corrected as shown below:

Column 2, Line 31 – Replace “FIG. 5*b*. are” with --FIG. 5*b* is--.

Column 4, Line 36-37 – Replace “configured provide” with --configured to provide--.

Column 4, Line 56 – Replace “anayte” with --analyte--.

Column 8, Line 59-60 – Replace “the the” with --the--.

Column 10, Line 8 – Replace “component are” with --components are--.

Column 10, Line 65 – Replace “indentify a” with --identifying a--.

Signed and Sealed this
Fourth Day of January, 2011

David J. Kappos
*Director of the United States Patent and Trademark Office*